(12) United States Patent
Heiland (10) Patent No.: US 7,822,509 B2
(45) Date of Patent: Oct. 26, 2010

(54) CONTROL SYSTEM FOR ACTIVE VIBRATION ISOLATION OF A SUPPORTED PAYLOAD

(75) Inventor: Peter Heiland, Raunheim (DE)

(73) Assignee: Integrated Dynamics Engineering GmbH (DE)

( * ) Notice: Subject to any disclaimer, the term of this patent is extended or adjusted under 35 U.S.C. 154(b) by 184 days.

(21) Appl. No.: 12/024,092

(22) Filed: Jan. 31, 2008

(65) Prior Publication Data

US 2008/0300726 A1    Dec. 4, 2008

(30) Foreign Application Priority Data

Feb. 5, 2007    (EP) .................................. 07002445

(51) Int. Cl.
    *G01M 1/38*    (2006.01)
(52) U.S. Cl. ...................................... 700/280; 702/196
(58) Field of Classification Search .................. 700/69, 700/71, 280; 702/56, 191–195, 196
    See application file for complete search history.

(56) References Cited

U.S. PATENT DOCUMENTS

| 4,600,863 A | 7/1986 | Chaplin et al. |
| 4,999,534 A | 3/1991 | Andrianos |

FOREIGN PATENT DOCUMENTS

| EP | 1 197 824 A1 | 4/2002 |

OTHER PUBLICATIONS

Rademakers, N.G.M.; modeling, Indentification and Multivariate Control of an Active Vibration Isolation System; Jun. 7, 2005; Eiddoven Univrestiy of Technology; Mater's Thesis; Chapter 2, pp. 1-11.*
Antkowial, B.; Simulation of Modal Vibration Pattern Varaitions Due to Gyroscopic Effects in an Active Vibrations Controller Structure:; Sep. 28, 2004; The Charles Strak Draper Laboratory; pp. 1-10.*
Schulz et al.; :Elgenstrutre Assignment and Controller Optimization for Mechanical Systmes; Jun. 1994; IEEE Transactions on Control Systems Technology; vol. 2; No. 2; pp. 88-100.*
Lee T.H. et al, Controller with decoupling for multivariable nonlinear servo-mechanisms, with application to real-time control of a passive line-of-sight stabilization system, Mechatronics vol. 7, No. 1, pp. 83-104, 1997, 1997 Elsevier Science Ltd.

* cited by examiner

*Primary Examiner*—Albert DeCady
*Assistant Examiner*—Chad Rapp
(74) *Attorney, Agent, or Firm*—DeMont & Breyer LLC (57) ABSTRACT

The invention relates to a control system for active vibration isolation of a supported payload with a control device that comprises a processing unit (41) for processing position data and orientation data of all available sensors to supply a sensor control matrix, as well as for subsequent calculation of axis input signals in orthogonal degrees of freedom from the sensor signals and the sensor control matrix, a downstream control-path cascade block (42) for processing axis input signals into axis output signals in orthogonal degrees of freedom, and a downstream processing unit (43) for processing position data and orientation data of all available actuators for vibration suppression into an actuator control matrix, as well as for subsequent calculation of actuator control signals from the axis output signals and the actuator control matrix.

10 Claims, 4 Drawing Sheets

CONTROL SYSTEM FOR ACTIVE VIBRATION ISOLATION OF A SUPPORTED PAYLOAD

The invention relates to a control system for active vibration isolation of a supported payload that comprises a number of vibration signal transducers for supplying sensor signals, a number of actuators for suppressing vibrations, and a control device for processing the sensor signals into actuator control signals.

A payload to be isolated is frequently supported by means of three or more isolator modules, to each of which two actuators for applying horizontal and vertical force are assigned, and sensors detect horizontal and vertical vibratory motions. In the sum of all sensors and actuators, their orientations are then selected such that all degrees of freedom of motion are controlled and can therefore be detected and driven.

Such control systems are known in principle, and the respective control devices can operate in either the analog or the digital mode. The advantage of signal processing at the analog level is the more rapid reaction time to disturbances acting on the vibration isolation system that can be achieved, in comparison to digital signal processing. Each analog/digital conversion, the sampling rate and the computation time within the sampling rate influence the signal transit time. In practice, the complexity of the control algorithm, particularly together with the computational power of a digital signal processor (DSP), thus substantially determine the maximal possible sampling rate and hence the shortest possible signal transit time. With respect to control devices operating in an analog mode, a digitally operating control device in turn has significant advantages with regard to good configurability, control possibilities by means of PC computers, and adaptability to changing system conditions.

Hitherto known control systems for vibration isolation, however, frequently have mutually dependent, so-called co-located control paths, particularly if one sensor and one actuator serve in each case as a control path and must of necessity be arranged spatially close to one another, thus achieving the goal of vibration isolation for relatively strong movements. The control paths can consequently influence one another, which leads to instability of control, and transient disturbances affect the system.

A method for vibration isolation is described in EP 1 197 824 A1 which, however, is based on the restrictive assumption that the resilient support center always coincides with the center of gravity.

One problem of the invention is to specify another, novel and considerably improved control system for controlling vibration isolation, with which in particular vibration isolation is made possible with all degrees of freedoms to be taken into account decoupled, so that additional calculations to compensate for cross-couplings in the control paths can be avoided.

The solution of the problem according to the invention is provided by an object with the characteristics of an appended independent claim.

Advantageous and/or preferred embodiments and refinements of the invention are the subject matter of the subordinate claims which, insofar as not otherwise expressly indicated, can be combined individually with one another.

For the solution, the invention consequently provides a control system for active vibration isolation of a supported payload, which comprises a number of vibration signal transducers or sensors for supplying sensor signals, a number of actuators for vibration suppression and a control device for processing sensor signals into actuator control signals, wherein the control device is adapted to perform processing of position data and orientation data of all available sensors into a sensor control matrix and processing of position data and orientation data of all available actuators into an actuator control matrix, for subsequent calculation of axis input signals in orthogonal degrees of freedom from the sensor signals and the sensor matrix, and for calculation of axis output signals in orthogonal degrees of freedom for vibration damping from the axis input signals and for calculation of appropriately weighted actuator control signals from the axis output signals and the actuator control matrix. The calculation of axis output signals for vibration damping or isolation from the axis input signals can consequently be performed in orthogonal degrees of freedom independently of one another.

The payload is, moreover, preferably supported by means of at least one isolator module, in particular a vertically and horizontally active air bearing comprising a base plate, an intermediate part arranged movably on the base plate, and a piston that is arranged movably inside the intermediate part and bears the load which is to be supported isolated from vibrations with respect to the base plate in the horizontal and vertical direction, wherein the ratio of the diameter of the upper side of the piston to the wall thickness of the intermediate part lies between 10-36, preferably 10-16, most preferably 10.7-15.1.

For such a control system, the invention further provides a control device comprising a first processing unit for processing position data and orientation data of all available sensors for supply of sensor signals to a sensor control matrix and for subsequent calculation of axis input signals in orthogonal degrees of freedom from the sensor signals and the sensor control matrix, a control-path cascade block, downstream of the first processing unit, for processing axis input signals into axis output signals in orthogonal degrees of freedom, and a processing unit, downstream of the control-path cascade block, for processing position data and orientation data of all available actuators for vibration suppression into an actuator control matrix, as well as for subsequent calculation of actuator control signals from the axis output signals and the actuator control matrix.

The invention thus uses a novel and considerably improved concept for the control of vibration isolation in relation to all degrees of freedom. All available sensors and actuators are combined in their orientation and position, and the sensor signals supplied, as well as required actuator control signals, are processed proportionally in relation to the degrees of freedom, so that they are independent of one another. The invention further enables the inclusion of rigid-body eigenmodes of the dynamic system, caused by rigidities of the isolator modules provided for supporting the payload to be isolated, into the signal processing, so that six orthogonal degrees of freedom can be controlled and parameterized independently of one another, and the signal processing is not implemented primarily only on Cartesian coordinates, but also on modal coordinates. Particularly since no effects on the other control paths are to be expected in the parameterization of the control paths, the installation can also be considerably simplified.

The invention consequently makes use of a trick for processing sensor signals into actuator control signals in order to be able to effect the independent control of six degrees of freedom in only six control paths. Therefore no additional calculations for compensating cross-couplings need to be taken into account, so that the computational cost remains low. Additionally necessary matrix operations in comparison to a co-located control are justified because the control paths can be parameterized and controlled independently of one another.

Additional advantages and characteristics of the invention follow from the description below, of preferred but nonlimiting, merely exemplary embodiments of the invention, with reference to the appended drawings.

Before the preferred signal processing of the invention is described in detail, a preferred construction of a control system according to the invention will be presented below.

Figure 1:
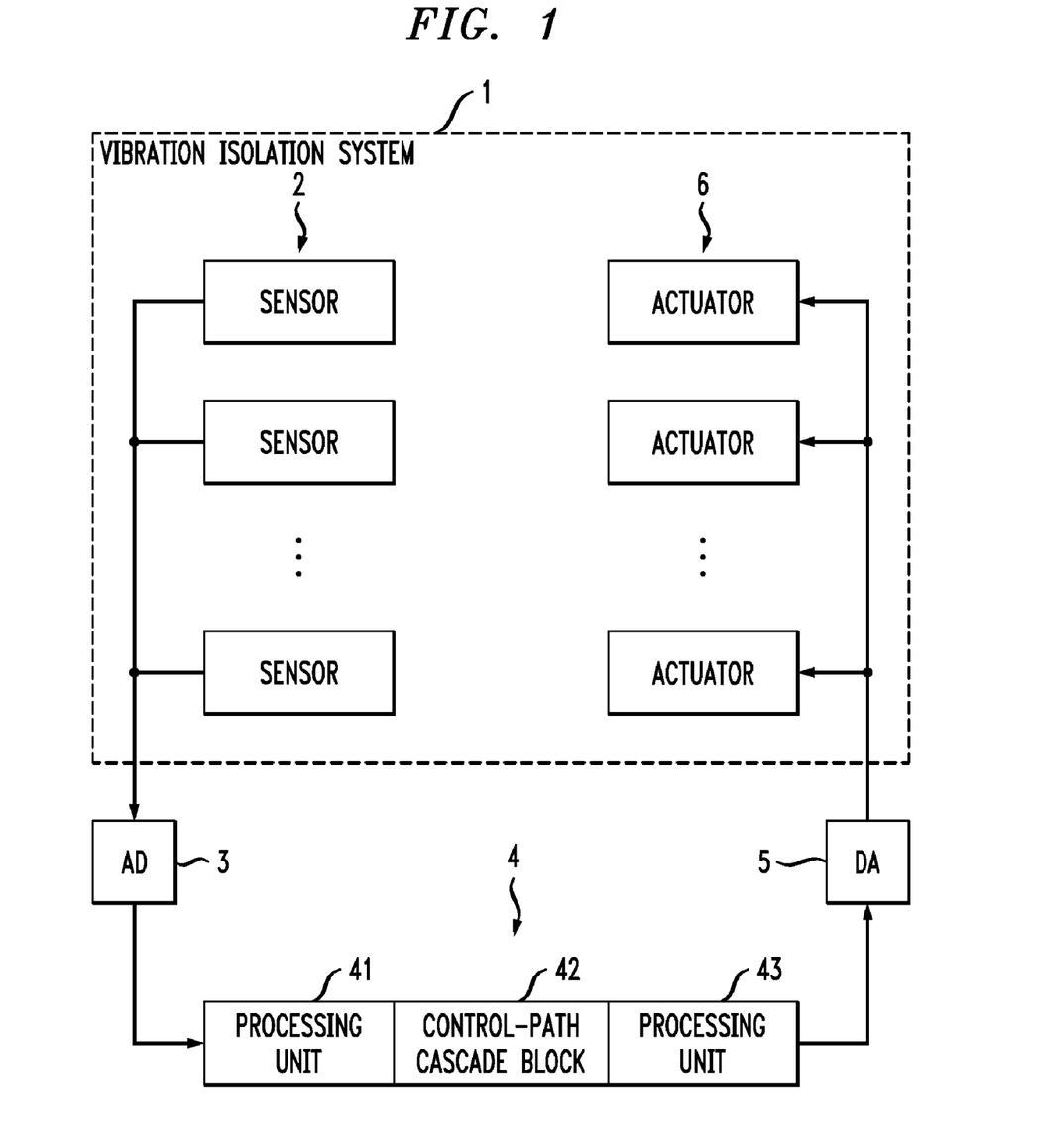
FIG. 1: a sketch of a basic arrangement of components of the control system according to the invention.

FIG. 1 shows the basic control scheme of a preferred active vibration isolation system 1. This vibration isolation system supports a mass to be isolated, or a payload, with respect to an underlying surface, and comprises a set of passive isolation elements or modules such as spring/absorber combinations made of rubber, air springs, steel springs and the like, and active elements which are controlled in opposite phase to a vibration excitation of the mass in order to isolate the mass against ground vibrations, for example. Such active vibration isolation systems are known in principle and will therefore not be presented in detail here.

Specifically, these active vibration isolation systems contain a number of vibration signal transducers or sensors 2 for supplying sensor signals, and a number of actuators 3 for suppressing vibration of the mass. The vibration signal transducers or sensors 2 are arranged around the mass to be isolated in a defined manner adapted to the purpose of use, including with regard to their directional sensitivity. The actuators 3 are likewise arranged in a suitable matter with respect to the mass in order to support it and to isolate the mass from vibrations relative to the surroundings or to counteract such vibrations.

The sensors 2 and the actuators 3, which in the illustrated example process analog signals, for example, are connected via a control device 4 that in the illustrated example operates digitally, for which reason it is connected on the input side to an analog/digital converter 3 for converting the analog sensor signals into digital sensor signals, and on the output side to a digital/analog converter 5 for converting the digital signals back into analog signals.

Control device 4 in such a case can comprise, for example, a digital signal processor DSP and or an FPGA (freely programmable gate array), wherein in this respect the contents of the European Patent Application with filing number 05 017 138 submitted by the same applicant on Aug. 5, 2005 are hereby incorporated into the present application in full by reference.

Figure 2:
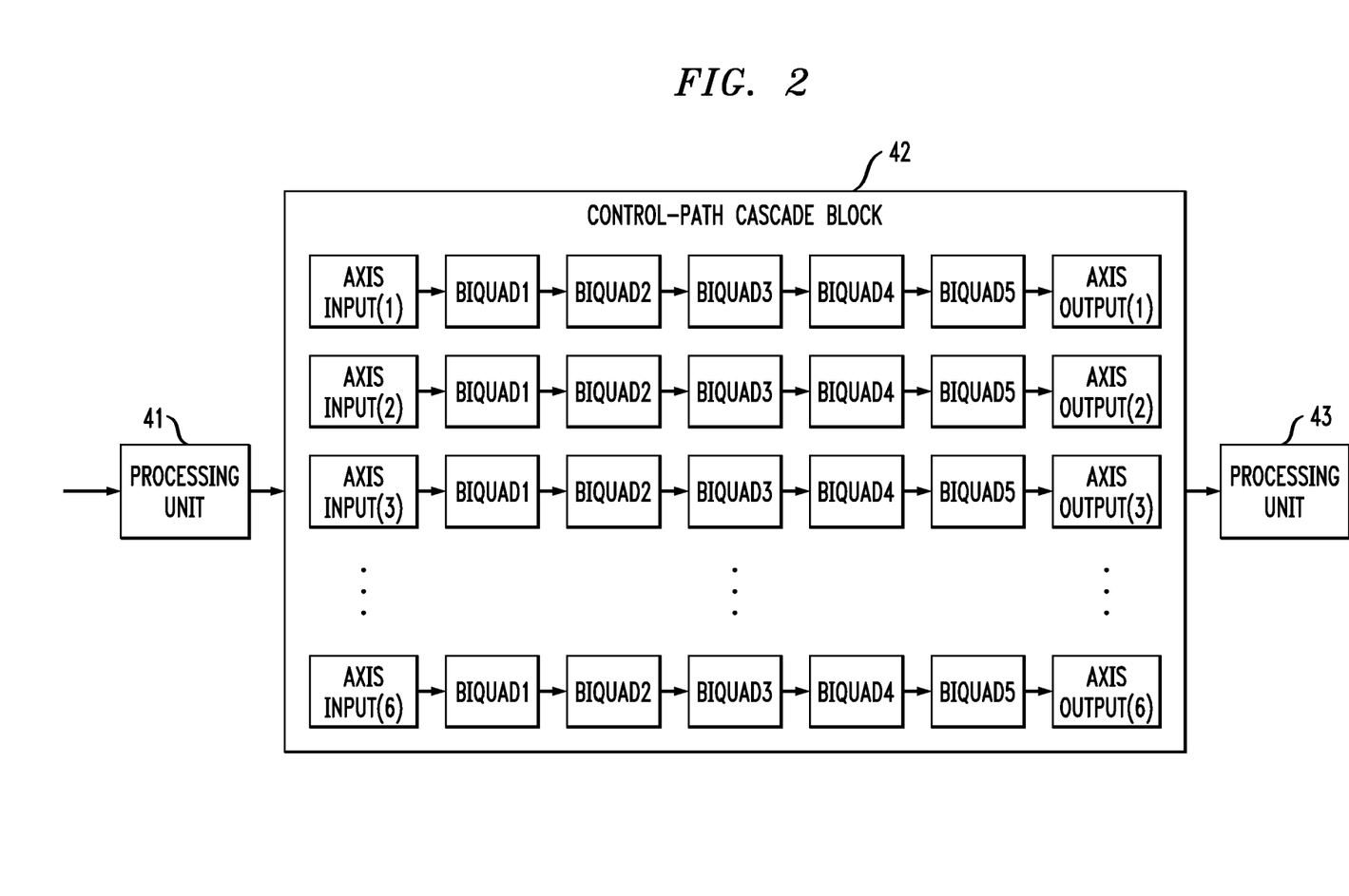
FIG. 2: a sketch of a detailed view of a control device according to the invention used in a control system according to FIG. 1, FIG. 3: a sketch, idealized for the sake of clarity, of a triangular arrangement of sensors about a payload in a control system according to the invention.

FIG. 2 shows the internal structure of a control device 4 according to the invention. A processing unit 41 is provided for calculating a sensor control matrix $\bar{\bar{g}}_s$ as well as for subsequent processing of the latter together with the sensor signals $\vec{S}_s$ into mutually independent axis input signals $\vec{A}_i$. Also provided is a processing unit 43 for calculating an actuator control matrix $\bar{\bar{g}}_a$ as well as for subsequent processing of the latter, in conjunction with the axis output signals $\vec{A}_o$ supplied by the control paths, into proportional actuator control signals $\vec{S}_a$. The control-path cascade block 42 illustrated in FIG. 2, which processes the axis input signals $\vec{A}_i$ of FIG. 2, also referred to as "axis input (i)" with i=1 . . . 6, into axis output signals $\vec{A}_o$ in FIG. 2, also referred to as "axis output (i)" with i=1 . . . 6, can be constructed as described in detail in the above-incorporated patent application.

The individual sensor signals $\vec{S}_s$ of a number $N_s$ of sensors are supplied to processing unit 41, which generates a $6 \times N_s$ matrix before the actual control and then multiplies the sensor signals $\vec{S}_s$ by the $6 \times N_s$ matrix in order to arrive at six axis input signals $\vec{A}_i$ for the total of 6 degrees of freedom, i.e. three translational and three rotational. In general form, therefore, a calculation function for $\vec{A}_i = \bar{\bar{g}}_s \cdot \vec{S}_s$ results for processing unit 41, wherein subsequently the axis signal vector $\vec{A}_i$ containing the axis input signals is processed in the illustrated control-path cascade block 42 with regard to the above-incorporated patent application, or in another control-path cascade block, into an axis output signal vector $\vec{A}_o$ containing the axis output signals.

The output signals of the axis output signal vector $\vec{A}_o$ are supplied to processing unit 43, which then multiplies a number $N_a$ of actuators by a previously generated $6 \times N_a$ matrix in order to obtain a number $N_a$ of actuator control signals $\vec{S}_a$. In general form, a calculation function of $$\vec{S}_a = \bar{\bar{g}}_a \cdot \vec{A}_o$$

results for a processing unit 43.

In case additional controllers are provided, it is likewise possible to refer to the above-incorporated patent application.

According to the invention, all available sensor signals of the $N_s$ sensors are gathered in a vector $\vec{S}_s$, and a matrix $\bar{\bar{g}}_{is}$ of dimension $6 \times N_s$ is generated (for six degrees of freedom), in order to process the vector $\vec{S}_s$ by matrix multiplication into a control vector $\vec{A}_i$ with orthogonal axis input signals. The determination of $\bar{\bar{g}}_s$ naturally takes on crucial importance here since it ensures that the decoupling is perfect. In this regard the invention proposes, as described below, to take the position of the sensors as well as their orientation into account together with the center of gravity of the systems. The axis output signals calculated for vibration isolation, after passing through processing unit 42, are in turn distributed onto the available number $N_a$ of actuators. For this purpose, an additional matrix $\bar{\bar{g}}_a$ (of dimension $6 \times N_a$ for six degrees of freedom), which takes into account the position of the actuators and their orientation relative to the center of gravity of the system, is generated in advance.

The generation of the matrices used for decoupling the axis signals and the additional signal processing according to the invention will be discussed below on the basis of exemplary embodiments.

The starting point of the invention is that it is frequently found when transmission functions of a vibration isolation system are measured that a number of resonance peaks, not just one, exist on an axis. The fundamental reason for this is that the control axes of the system, which are conventionally selected such that they satisfy the six Cartesian degrees of freedom, i.e., the three translational degrees of freedom along the X, Y and Z taxis as well as the three rotational degrees of freedom about these axes, referred to below as XT, YT, ZT, XR, YR and ZR, are not sufficiently decoupled. In other words, if only one degree of freedom is to be excited, one or more other degrees of freedom are excited along with it. This inevitably leads to problems in the adjustment of a control device for this vibration isolation system because, for example, additional phase shifts are introduced into the frequency characteristics. If an actuator aligned or oriented for application of a vertical force, for example, is excited under one edge of a rectangular plate that rests on four isolator modules, this conventionally has the effect that a movement is also detected at the adjacent edges.

The invented control device therefore processes the position data and orientation data of all available sensors in the sensor control matrix $\ddot{g}_s$, and the position data and orientation data of all available actuators in the actuator control matrix $\ddot{g}_a$ as will be described below.

Let the initial assumption be a general active vibration isolation system having a number $N_s$ of sensors and a number $N_a$ of actuators. The random position of the i-th actuator and the i-th sensor in relation to the center of gravity of the system to be isolated, i.e., in particular the isolator module or modules and the mass supported on them, is determined by and can be specified to the control system by the vectors $\vec{p}_{ai}$ and $\vec{p}_{si}$ respectively. Additionally, the sensors and actuators are each arranged to detect vibration components along a direction or to effect movements along a direction, respectively. These arrangements or orientations are likewise specified in advance and can be specified to the control system via the vectors $\vec{r}_{si}$ and $\vec{r}_{ai}$. Weighting factors $\ddot{s}_{ij}$ and $\ddot{a}_{ij}$ for the respective sensor signals and actuator signals are additionally input, in order to proportionally account for the j-th Cartesian degree of freedom corresponding to the respective orientation.

Since the procedures for the generation of the control matrices for the sensors and for the actuators substantially correspond to one another, a variable name "g" that designates such a device in general will be selected below instead of the variable names "s" and "a." Consequently a number "$N_g$" of devices with the respective positions $\vec{p}_{gi}$, directions $\vec{r}_{gi}$ and weights $\ddot{g}_{ij}$ will initially be assumed.

The total force exerted by the actuators along the translational degrees of freedom j (with j=1 ... 3) results as $$f_j = \sum_{i=1}^{N_g} g_{ij} \vec{r}_{gi} \cdot \vec{e}_j$$

where $\vec{e}_j$ is the unit vector along the respective degree of freedom, i.e. $\vec{e}_x$ for an x-direction, for example.

Applied to the sensors, this holds correspondingly for the overall position or overall velocity of the mass detected by the sensors, depending on whether position sensors or velocity sensors are used in the respective application.

The total torque about a respective Cartesian axis j (with j=1 ... 3) is $$m_j = \sum_{i=1}^{N_g} g_{i,j+3} \left( \vec{p}_{gi} \times \vec{r}_{gi} \right) \cdot \vec{e}_j$$

where $\vec{e}_j$ is now the unit vector along the axis of rotation, i.e. $\vec{e}_y$ for a Y-rotation, and x represents the symbol for a vector cross-product.

Applied to the sensors, this again holds accordingly for the overall angle or overall angular velocity detected by the sensors.

To summarize, a six-dimensional force vector (or correspondingly, a position or velocity vector) results in a further simplified form $$\vec{F} = \begin{bmatrix} \vec{f} \\ \vec{m} \end{bmatrix}$$

where the index j runs in this case from 1 to 6.

The calculation of the weights $\ddot{g}_{ij}$ is preferably performed by the control device using a set of linear equations in matrix form, i.e., by means of, for example, the equation $$\vec{\vec{A}} \cdot \vec{g}^T = \vec{\vec{E}}$$

in which the raised dot represents a matrix multiplication, the superscript "T" a matrix transposition, $\vec{\vec{E}}$ a 6×6 unit matrix for six degrees of freedom, $\vec{\vec{A}}$ a 6×$N_g$ matrix with $$\vec{A} = \begin{bmatrix} (\vec{r}_{g1})_x & (\vec{r}_{g2})_x & \cdots & (\vec{r}_{gN_g})_x \\ (\vec{r}_{g1})_y & (\vec{r}_{g2})_y & \cdots & (\vec{r}_{gN_g})_y \\ (\vec{r}_{g1})_z & (\vec{r}_{g2})_z & \cdots & (\vec{r}_{gN_g})_z \\ (\vec{p}_{g1} \times \vec{r}_{g1})_x & (\vec{p}_{g2} \times \vec{r}_{g2})_x & \cdots & (\vec{p}_{gN_g} \times \vec{r}_{gN_g})_x \\ (\vec{p}_{g1} \times \vec{r}_{g1})_y & (\vec{p}_{g2} \times \vec{r}_{g2})_y & \cdots & (\vec{p}_{gN_g} \times \vec{r}_{gN_g})_y \\ (\vec{p}_{g1} \times \vec{r}_{g1})_z & (\vec{p}_{g2} \times \vec{r}_{g2})_z & \cdots & (\vec{p}_{gN_g} \times \vec{r}_{gN_g})_z \end{bmatrix}$$

and $\ddot{g}=[g_{ij}]$ the 6×$N_g$ matrix of the weights to be determined. This matrix represents an actuator matrix or a sensor matrix to be generated according to the invention.

The following assumptions are expediently made for a calculation of the weights. If a vibration system has six sensors and six actuators, in a typical vibration isolation system with three isolator modules, for example, all the matrices described above are 6×6 matrices, and all six degrees of freedom can thus can be addressed in principle by the control system with appropriately suitable arrangements and orientations of sensors and actuators.

The sensor matrix or actuator matrix in this case results as $$\ddot{g} = \left( \vec{\vec{A}}^{-1} \right)^T$$

Frequently however, two arrangements deviate from this.

A): fewer sensors than degrees of freedom are available, or some sensors are oriented along a common direction, so that not all degrees of freedom can be monitored or detected with the sensors for the controller.

B): additionally or alternatively, more actuators than degrees of freedom are available, so that no unambiguous solution can be determined for the actuator matrix, but only a number of equivalent solutions.

In both cases, however, a definite solution is generated by processing unit 41 or 43 with conventionally known techniques such as the technique of singular value decomposition (SVD). A preferred generation of a definite solution according to the invention uses the general functional processing rule $$\ddot{\vec{g}} = [\vec{V} \cdot (\vec{W}^{-1})' \cdot \vec{U}^T]^T$$

where $\vec{V}$ is an orthogonal n×n matrix, $(\vec{W}^{-1})'$ is the inverse of a diagonal n×n matrix, wherein all diagonal values $1/w_i$ for $w_i=0$ are set to zero and $\vec{U}^T$ is a transposed column-orthogonal m×n matrix.

If m>n, this corresponds to case A) in which, however, the degree of freedom that cannot be detected can be determined via the SVD approach, and this information is accordingly usable for further processing by the user. If m<n, this corresponds to the above case B), wherein a definite solution can be calculated via the latter processing rule, and the complete solution space around this definite solution is defined by the vectors contained in the columns i of matrix $\vec{V}$ for which $w_i=0$. For m=n, the inverse matrix is calculated and thus an unambiguous solution is determined.

Figure 3:
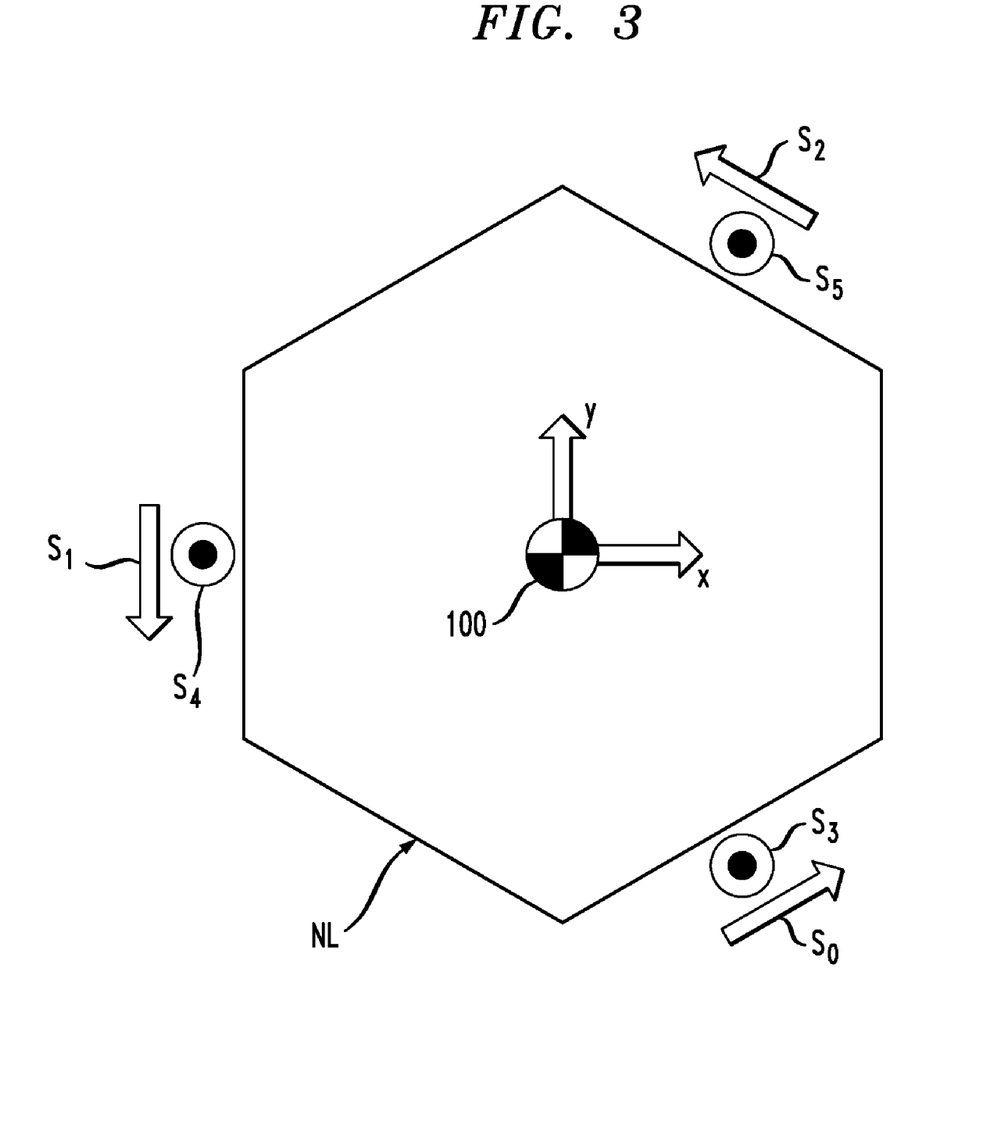

To further clarify the invention, the assumption below will initially be an arrangement of a vibration isolation system idealized for the sake of simplicity, in which six sensors s0-s5 are arranged, as in FIG. 3, substantially in a triangular form around a payload "NL," and initially lie in the plane of the center of gravity. Sensors s0, s1 and s2 are arranged to detect horizontal vibration components (or positions or velocities) and sensors s3, s4 and s5 are arranged for detecting vertical vibration components (or positions or velocities). In relation to a fixed point 100, the positions $p_{si}$ of the sensors $s_i$, with i=0 . . . 5 that are specified to the control device of the system, have the following x-, y and z-axis components, for example:

ps0: [x]⁻=0.5000; ps0: [y]=−0.8660; ps0: [z]=0.0000;
ps1: [x]=−1.0000; ps1: [Y]=0.0000; ps1: [z]=0.0000;
ps2: [x]=0.5000; ps2: [Y]=0.8660; ps2: [z]=0.0000;
ps3: [x]=0.5000; ps3: [Y]=−0.8660; ps3: [z]=0.0000;
ps4: [x]=−1.0000; ps4: [Y]=0.0000; ps4: [z]=0.0000;
ps5: [x]=0.5000; ps5: [Y]=0-8660; ps5: [z]=0.0000;

and the directions $r_{si}$ of the sensors, with i=1 . . . 5, have the following x, y and z components, for example:

rs0: [x]=0.8660; rs0: [y]=0.5000; rs0: [z]=0.0000;
rs1: [x]=0.0000; rs1: [y]=−1.0000; rs1: [z]=0.0000;
rs2: [x]=−0.8660; rs2: [Y]=0.5000; rs2: [z]=0.0000;
rs3: [x]=0.0000; rs3: [Y]=0.0000; rs3: [z]=1.0000;
rs4: [x]=0.0000; rs4: [Y]=0.0000; rs4: [z]=1.0000;
rs5: [x]=0.0000; rs5: [Y]=0.0000; rs5: [Z]=1.0000;

After processing the data, the control device generates a matrix $\vec{A}$ with the following system of linear equations:

|    | s0     | s1      | s2      | s3      | s4     | s5      |
|----|--------|---------|---------|---------|--------|---------|
| XT | 0.8660 | 0.0000  | −0.8660 | 0.0000  | 0.0000 | 0.0000  |
| YT | 0.5000 | −1.0000 | 0.5000  | 0.0000  | 0.0000 | 0.0000  |
| ZR | 1.0000 | 1.0000  | 1.0000  | 0.0000  | 0.0000 | 0.0000  |
| ZT | 0.0000 | 0.0000  | 0.0000  | 1.0000  | 1.0000 | 1.0000  |
| XR | 0.0000 | 0.0000  | 0.0000  | −0.8660 | 0.0000 | 0.8660  |
| YR | 0.0000 | 0.0000  | 0.0000  | −0.5000 | 1.0000 | −0.5000 |

A y displacement of the payload by an amount α thus leads to sensor signals of sensors s0, s1 and s2 on the order of +0.5α, −1, 0α and +0.5α, respectively. Correspondingly, an x rotation of the payload by an amount α leads to sensor signals of sensors s3 and s5 on the order of −0.8660α and +0.8660α.

The sensor matrix $\ddot{g}$ calculated based on this leads to the definite solution vectors:

|    | s0     | s1      | s2      | s3      | s4     | s5      |
|----|--------|---------|---------|---------|--------|---------|
| XT | 0.5774 | 0.0000  | −0.5774 | 0.0000  | 0.0000 | 0.0000  |
| YT | 0.3333 | −0.6667 | 0.3333  | 0.0000  | 0.0000 | 0.0000  |
| ZR | 0.3333 | 0.3333  | 0.3333  | 0.0000  | 0.0000 | 0.0000  |
| ZT | 0.0000 | 0.0000  | 0.0000  | 0.3333  | 0.3333 | 0.3333  |
| XR | 0.0000 | 0.0000  | 0.0000  | −0.5774 | 0.0000 | 0.5774  |
| YR | 0.0000 | 0.0000  | 0.0000  | −0.3333 | 0.6667 | −0.3333 |

This matrix comprising the definite solution vectors forms, according to the invention, a corresponding sensor control matrix $\ddot{g}_s$ (FIG. 2) for controlling the example of a vibration isolation system. Consequently the respective sensor signals are now taken into account axis-proportionally in the vibration isolation control in the subsequent processing.

In other words, the processing rule for the control device for handling an x-displacement, for example, states that the supplied signals of sensors 0 and 2 must be weighted by +0.5774 and −0.5774, respectively, and added. This processing matrix is not unambiguous, however, since the rows can be multiplied by an arbitrary factor and thus only the relative ratios of the sensor signals to one another in regard to each degree of freedom are fixed.

As is further evident, the rows of the matrix are orthogonal to one another and the sum of the products of the elements of two rows cancels itself out, which indicates that the degrees of freedom for the control paths are decoupled from one another. In the present example case, however, the initially assumed precondition that the payload "NL" is self-supporting and has none of the associated rigidities still holds.

Furthermore, the horizontal and vertical degrees of freedom are decoupled from one another, so that if the matrix is grouped as represented above, it consists of two 3×3 matrices, while all other elements that represent horizontal degrees of freedom with vertically oriented sensors or the converse are zero. If all sensors are arranged in the plane of the center of gravity, that is a result of the special system arrangement shown in FIG. 3. This changes if the center of gravity lies outside the sensor plane or if not all sensors are arranged at the same height. In order to illustrate this change and to present the application of the invention to such modified vibration systems as well, the assumption below will be a vibration isolation system modified in a manner such that the center of gravity is arranged, for example, 50 cm above the sensor plane and the individual sensor data to be input change, particularly in regard to the z-axis.

After processing the correspondingly modified position and orientation data that is specified for this modified case, a matrix $\overleftrightarrow{A}$ is generated with the following system of linear equations:

|    | s0      | s1      | s2      | s3      | s4     | s5      |
|----|---------|---------|---------|---------|--------|---------|
| XT | 0.8660  | 0.0000  | −0.8660 | 0.0000  | 0.0000 | 0.0000  |
| YT | 0.5000  | −1.0000 | 0.5000  | 0.0000  | 0.0000 | 0.0000  |
| ZR | 1.0000  | 1.0000  | 1.0000  | 0.0000  | 0.0000 | 0.0000  |
| ZT | 0.0000  | 0.0000  | 0.0000  | 1.0000  | 1.0000 | 1.0000  |
| XR | 0.2500  | −0.5000 | 0.2500  | −0.8660 | 0.0000 | 0.8660  |
| YR | −0.4330 | 0.0000  | 0.4330  | −0.5000 | 1.0000 | −0.5000 |

As is evident, an x-rotation of the payload by an amount $\alpha$ now leads to sensor signals of sensors s0, s1, s2, s3 and s5 on the order of +0.2500$\alpha$, −0.5000$\alpha$, +0.2500$\alpha$, −0.8660$\alpha$ and +0.8660$\alpha$, respectively.

The modified sensor control matrix $\overleftrightarrow{g}$ then calculated with this leads to the defined solution vectors:

|    | s0     | s1      | s2      | s3      | s4     | s5      |
|----|--------|---------|---------|---------|--------|---------|
| XT | 0.5774 | 0.0000  | −0.5774 | −0.1667 | 0.3333 | −0.1667 |
| YT | 0.3333 | −0.6667 | 0.3333  | 0.2887  | 0.0000 | −0.2887 |
| ZR | 0.3333 | 0.3333  | 0.3333  | 0.0000  | 0.0000 | 0.0000  |
| ZT | 0.0000 | 0.0000  | 0.0000  | 0.3333  | 0.3333 | 0.3333  |
| XR | 0.0000 | 0.0000  | 0.0000  | −0.5774 | 0.0000 | 0.5774  |
| YR | 0.0000 | 0.0000  | 0.0000  | −0.3333 | 0.6667 | −0.3333 |

In other words, the modified processing rule for the control system to handle an x-displacement now states that the sensor signals supplied by sensors 0, 2, 3, 4 and 5 are to be weighted with +0.5774, −0.5774, −0.1667, +0.3333 and −0.1667 respectively, and added. It is further evident that a correction need be carried out only in regard to the horizontal degrees of freedom along the x and y-axes.

For the description below of the generation and further processing of an example of an actuator control matrix according to the invention, another idealized arrangement of a vibration isolation system will be assumed for the sake of simplicity, in which eight actuators a0 through a7 are positioned according to FIG. 4 in a substantially rectangular arrangement below a payload "NL," and lie in the plane of the center of gravity. Furthermore, actuators a0 and a4, a1 and a5, a2 and a6, as well as a3 and a7 are each arranged at or inside, e.g. in the center, of one of four isolator modules 50 that support the payload, actuators a0, a1, a2 and a3 being arranged to apply horizontal forces, and actuators a4, a5, a6 and a7 to apply vertical forces. In relation to a fixed point 100, the positions $p_{ai}$ of the actuators $a_i$, with i=0 . . . 7 that are specified to the control device of the systems, have the following x, y and z axis components, for example:

$p_a0$: [x]=1.50; $p_a0$: [y]=−1.00; $p_a0$: [z]=0.0;
$p_a1$: [x]=−1.50; $p_a1$: [y]=−1.00; $p_a1$: [z]=0.0;
$p_a2$: [x]=−1.50; $p_a2$: [y]=1.00; $p_a2$: [z]=0.0;
$p_a3$: [x]=1.50; $p_a3$: [y]=1.00; $p_a3$: [z]=0.0;
$p_a4$: [x]=1.50; $p_a4$: [y]=−1.00; $p_a4$: [z]=0.0;
$p_a5$: [x]=−1.50; $p_a5$: [y]=−1.00; $p_a5$: [z]=0.0;
$p_a6$: [x]=−1.50; $p_a6$: [y]=1.00; $p_a6$: [z]=0.0;
$p_a7$: [x]=1.50; $p_a7$: [y]=1.00; $p_a7$: [z]=0.0;

and the directions $r_{ai}$ of the actuators with i=0 . . . 7 have the following x, y and z components, for example:

$r_a0$: [x]=0.0; $r_a0$: [y]=1.0; $r_a0$: [z]=0.0;
$r_a1$: [x]=1.0; $r_a1$: [y]=0.0; $r_a1$: [z]=0.0;
$r_a2$: [x]=0.0; $r_a2$: [y]=−1.0; $r_a2$: [z]=0.0;
$r_a3$: [x]=−1.0; $r_a3$: [y]=0.0; $r_a3$: [z]=0.0;
$r_a4$: [x]=0.0; $r_a4$: [y]=0.0; $r_a4$: [z]=1.0;
$r_a5$: [x]=0.0; $r_a5$: [y]=0.0; $r_a5$: [z]=1.0;
$r_a6$: [x]=0.0; $r_a6$: [y]=0.0; $r_a6$: [z]=1.0;
$r_a7$: [x]=0.0; $r_a7$: [y]=0.0; $r_a7$: [z]=1.0;

After the processing of this data, a matrix $\overleftrightarrow{A}$ with the following system of linear equations is generated:

|    | a0     | a1     | a2      | a3      | a4      | a5      | a6     | a7      |
|----|--------|--------|---------|---------|---------|---------|--------|---------|
| XT | 0.0000 | 1.0000 | 0.0000  | −1.0000 | 0.0000  | 0.0000  | 0.0000 | 0.0000  |
| YT | 1.0000 | 0.0000 | −1.0000 | 0.0000  | 0.0000  | 0.0000  | 0.0000 | 0.0000  |
| ZR | 1.5000 | 1.0000 | 1.5000  | 1.0000  | 0.0000  | 0.0000  | 0.0000 | 0.0000  |
| ZT | 0.0000 | 0.0000 | 0.0000  | 0.0000  | 1.0000  | 1.0000  | 1.0000 | 1.0000  |
| XR | 0.0000 | 0.0000 | 0.0000  | 0.0000  | −1.0000 | −1.0000 | 1.0000 | 1.0000  |
| YR | 0.0000 | 0.0000 | 0.0000  | 0.0000  | −1.5000 | 1.5000  | 1.5000 | −1.5000 |

A displacement of the payload in the y-direction by an amount α thus results from actuator signals of actuators a0 or a2 on the order of +1.0α and −1.0α. Accordingly, an application of force for an x rotation by an amount α results from actuator signals of actuators a4, a5, a6 or a7 on the order of −1.0α, 1.0α, +1.0α and +1.0α, respectively.

An actuator matrix $\vec{g}$ calculated on this basis leads to the definite solution vectors:

|    | a 0    | a 1    | a 2     | a 3     | a 4     | a 5     | a 6    | a 7     |
|----|--------|--------|---------|---------|---------|---------|--------|---------|
| XT | 0.0000 | 0.5000 | 0.0000  | −0.5000 | 0.0000  | 0.0000  | 0.0000 | 0.0000  |
| YT | 0.5000 | 0.0000 | −0.5000 | 0.0000  | 0.0000  | 0.0000  | 0.0000 | 0.0000  |
| ZR | 0.2308 | 0.1538 | 0.2308  | 0.1538  | 0.0000  | 0.0000  | 0.0000 | 0.0000  |
| ZT | 0.0000 | 0.0000 | 0.0000  | 0.0000  | 0.2500  | 0.2500  | 0.2500 | 0.2500  |
| XR | 0.0000 | 0.0000 | 0.0000  | 0.0000  | −0.2500 | −0.2500 | 0.2500 | 0.2500  |
| YR | 0.0000 | 0.0000 | 0.0000  | 0.0000  | −0.1667 | 0.1667  | 0.1667 | −0.1667 |

This matrix comprising definite solution vectors now forms according to the invention an actuator control matrix $\vec{\ddot{g}}_a$ (FIG. 2) for controlling this example of a vibration isolation system. Consequently, the respective actuator control signals for the vibration isolation control can again be taken into account axis-proportionally.

In other words, the processing rule for the control device for exerting a force for a displacement in the x-direction according to an axis output signal calculated by unit 42 of FIG. 2 states that the force must be distributed over control signals of actuators 1 or 3 weighted with +0.5 and −0.5. Taking the description above into account, it is evident that this matrix $\vec{\ddot{g}}_a$ is not unambiguous, and that each linear combination of the vectors

| 0.3922 | −0.5883 | 0.3922 | −0.5883 | 0.0000  | 0.0000 | 0.0000  | 0.0000 |
| 0.0000 | 0.0000  | 0.0000 | 0.0000  | −0.5000 | 0.5000 | −0.5000 | 0.5000 | can be added, for example, to each row of this matrix $\vec{g}$ so that, together with the definite solution, a two dimensional solution space is output.

In order to generate additional solution matrices on this basis and to calculate an additional suitable solution, the invention proposes the following method, for example.

First of all the first vector of the solution space is added to row ZR after multiplication by the factor 0.1538/0.5883, and secondly row ZR and row YR are normalized, so that the sum of the absolute values in each row corresponds to the value "1."

Thus the following solution vectors in matrix form result.

Figure 4:
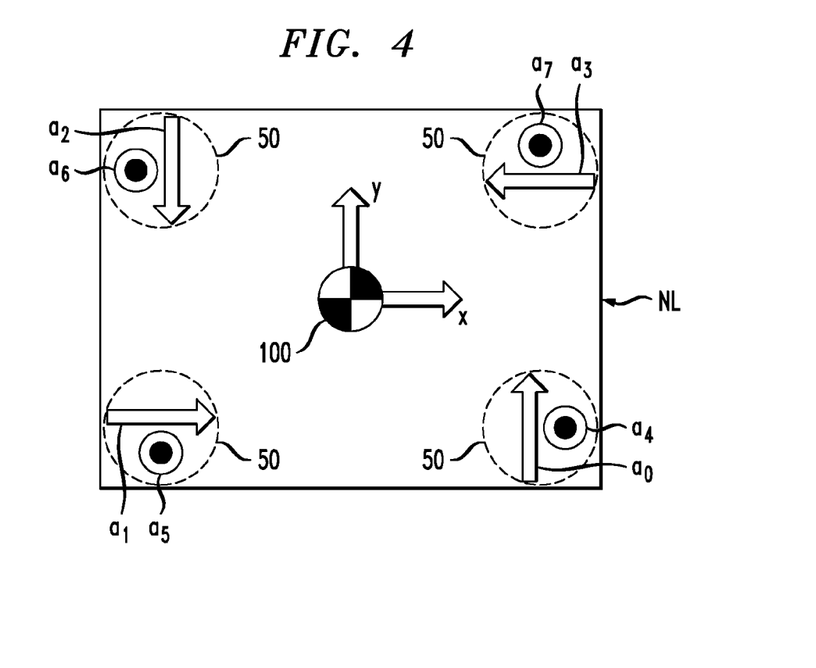
FIG. 4: a sketch, idealized for the sake of clarity, of an arrangement of actuators for a payload in a control system according to the invention, wherein each actuator is associated with an isolator module.

This actuator control matrix is substantially valid for every arrangement according to FIG. 4 independently of the dimensions of the payload, insofar as all actuators are arranged in the plane of the center of gravity. If the center of gravity lies outside the actuator plane, this change can be taken into account in the manner described relative to FIG. 3, so that a correspondingly modified actuator control matrix is calculated and applied in the control for vibration isolation.

The invention therefore enables the calculation of sensor and actuator control matrices with decoupled Cartesian axis components and with a substantially arbitrary arrangement of the center of gravity, wherein the assumption was first made above that no passive isolation elements or modules having a given rigidity, such as spring/shaft combinations of rubber, air springs, steel springs and the like, for passive vibration dampening are present.

However, since the payload is usually also connected to passive isolators that have a given rigidity, the degrees of freedom of the payload in this case continue to be coupled to one another.

In a further elaboration for additional improvement of the control quality, the invention therefore provides for determining the six rigid-body eigenmodes of the dynamic system consisting of the payload and the isolators connected thereto. The additional vectors for handling these additional vibrating eigenmodes, which are calculated by the control device for this purpose according to the description below, will be processed into appropriate modal coordinates to distinguish them from the Cartesian coordinates.

In this additional calculation, the initial assumption is a rigid body with a mass m and the principal moments of inertia $I_{xx}$, $I_{yy}$ and $I_{zz}$. The rigid body is supported, for example, by a number $N_{IM}$ of passive isolation modules with a respective rigidity $k_i$ ($i=1 \ldots N_{IM}$), these isolation modules being con-

|    | a 0    | a 1    | a 2     | a 3     | a 4     | a 5     | a 6    | a 7     |
|----|--------|--------|---------|---------|---------|---------|--------|---------|
| XT | 0.0000 | 0.5000 | 0.0000  | −0.5000 | 0.0000  | 0.0000  | 0.0000 | 0.0000  |
| YT | 0.5000 | 0.0000 | −0.5000 | 0.0000  | 0.0000  | 0.0000  | 0.0000 | 0.0000  |
| ZR | 0.5000 | 0.0000 | 0.5000  | 0.0000  | 0.0000  | 0.0000  | 0.0000 | 0.0000  |
| ZT | 0.0000 | 0.0000 | 0.0000  | 0.0000  | 0.2500  | 0.2500  | 0.2500 | 0.2500  |
| XR | 0.0000 | 0.0000 | 0.0000  | 0.0000  | −0.2500 | −0.2500 | 0.2500 | 0.2500  |
| YR | 0.0000 | 0.0000 | 0.0000  | 0.0000  | −0.2500 | 0.2500  | 0.2500 | −0.2500 | nected relative to the center of gravity at the points $\vec{r}_i (i=1 \ldots N_{IM})$ and extending in the direction $\vec{R}_i (i=1 \ldots N_{IM})$. In case of a slight displacement of the rigid body from its equilibrium position, it experiences a restoring force from the i-th passive isolation module of $$\vec{f}_i = -k_i \vec{R}_i (\vec{x} \cdot \vec{R}_i + \vec{\theta} \cdot [\vec{R}_i \times \vec{r}_i])$$

and a restoring torque of $$\vec{\tau}_i = -k_i [\vec{R}_i \times \vec{r}_i] (\vec{x} \cdot \vec{R}_i + \vec{\theta} \cdot [\vec{R}_i \times \vec{r}_i])$$

where $\vec{x} = (x, y, z)^T$ represents a small translational displacement and $\vec{\theta} = (\theta_x, \theta_y, \theta_z)^T$ represents a small rotation, in vector form in each case.

To summarize, a six-dimensional force vector $$\vec{F} = \sum_{i=1}^{N_{IM}} \begin{bmatrix} \vec{f}_i \\ \vec{\tau}_i \end{bmatrix}$$

in generalized form thus results, as well as a displacement vector $$\vec{X} = \begin{bmatrix} \vec{x} \\ \vec{\theta} \end{bmatrix}$$

so that the generalized restoring force exerted by such passive isolation modules on the rigid body can be described with $$\vec{F} = -\vec{K} \cdot \vec{X}$$

Where $$\vec{K} = \sum_i k_i \begin{bmatrix} R_{ix}^2 & R_{ix}R_{iy} & R_{ix}R_{iz} & R_{ix}(\vec{R}_i \times \vec{r}_i)_x & R_{ix}(\vec{R}_i \times \vec{r}_i)_y & R_{ix}(\vec{R}_i \times \vec{r}_i)_z \\ R_{ix}R_{iy} & R_{iy}^2 & R_{iy}R_{iz} & R_{iy}(\vec{R}_i \times \vec{r}_i)_x & R_{iy}(\vec{R}_i \times \vec{r}_i)_y & R_{iy}(\vec{R}_i \times \vec{r}_i)_z \\ R_{ix}R_{iz} & R_{iy}R_{iz} & R_{iz}^2 & R_{iz}(\vec{R}_i \times \vec{r}_i)_x & R_{iz}(\vec{R}_i \times \vec{r}_i)_y & R_{iz}(\vec{R}_i \times \vec{r}_i)_z \\ R_{ix}(\vec{R}_i \times \vec{r}_i)_x & R_{iy}(\vec{R}_i \times \vec{r}_i)_x & R_{iz}(\vec{R}_i \times \vec{r}_i)_x & (\vec{R}_i \times \vec{r}_i)_x^2 & (\vec{R}_i \times \vec{r}_i)_x(\vec{R}_i \times \vec{r}_i)_y & (\vec{R}_i \times \vec{r}_i)_x(\vec{R}_i \times \vec{r}_i)_z \\ R_{iy}(\vec{R}_i \times \vec{r}_i)_y & R_{iy}(\vec{R}_i \times \vec{r}_i)_y & R_{iz}(\vec{R}_i \times \vec{r}_i)_y & (\vec{R}_i \times \vec{r}_i)_x(\vec{R}_i \times \vec{r}_i)_y & (\vec{R}_i \times \vec{r}_i)_y^2 & (\vec{R}_i \times \vec{r}_i)_y(\vec{R}_i \times \vec{r}_i)_z \\ R_{ix}(\vec{R}_i \times \vec{r}_i)_z & R_{iy}(\vec{R}_i \times \vec{r}_i)_z & R_{iz}(\vec{R}_i \times \vec{r}_i)_z & (\vec{R}_i \times \vec{r}_i)_x(\vec{R}_i \times \vec{r}_i)_z & (\vec{R}_i \times \vec{r}_i)_y(\vec{R}_i \times \vec{r}_i)_z & (\vec{R}_i \times \vec{r}_i)_z^2 \end{bmatrix}$$

is a symmetrical 6×6 rigidity matrix.

A mass matrix according to $$\vec{M} = \begin{bmatrix} m & 0 & 0 & 0 & 0 & 0 \\ 0 & m & 0 & 0 & 0 & 0 \\ 0 & 0 & m & 0 & 0 & 0 \\ 0 & 0 & 0 & I_{xx} & 0 & 0 \\ 0 & 0 & 0 & 0 & I_{yy} & 0 \\ 0 & 0 & 0 & 0 & 0 & I_{zz} \end{bmatrix}$$

is also incorporated into the calculation by the control device, so that the calculated movement equation for the passive, free system, i.e. neglecting frictional damping, reads:

$$\vec{M} \cdot \ddot{\vec{X}} + \vec{K} \cdot \vec{X} = 0$$

which is further processed using a Fourier transform to $(\vec{M}^{-1} \vec{K}) = \omega^2 \vec{X}$, wherein the matrix $\vec{M}^{-1} \vec{K}$ is usually not symmetrical. $\vec{X}$ contains the eigenvectors in modal coordinates to be determined, and $\omega^2$ represents the eigenvalues corresponding to the passive resonant frequencies for these modes.

With suitable computer-assisted calculation routines, the eigenvectors $\vec{X}$ can therefore be calculated together with their resonant frequencies.

Based on the coordinate system underlying the Cartesian degrees of freedom, the eigenvectors are initially given in the form $\vec{c} = (x, y, z, \theta_x, \theta_y, \theta_z)^T$. In order to transform such eigenvectors based on the Cartesian degrees of freedom into the sensor and actuator control matrices, the so-called modal transformation is performed according to the invention, as will be described below.

The starting point here is that a matrix $\vec{V}$, in the columns of which the six eigenvectors in Cartesian coordinates are contained, additionally constitutes a transformation matrix between a vector $\vec{c}$ based on the Cartesian coordinates and a vector $\vec{m}$ based on the modal coordinates, i.e. $\vec{c} = \vec{V} \cdot \vec{m}$.

To determine a transformation for the generalized forces, $\vec{X}$ in the above equation $\vec{M} \cdot \ddot{\vec{X}} + \vec{K} \cdot \vec{X} = 0$ is now replaced by $\vec{c}$ and an external force $\vec{F}$ is added, i.e., $\vec{M} \cdot \vec{V} \cdot \ddot{\vec{m}} + \vec{K} \cdot \vec{V} \cdot \vec{m} = \vec{F}$.

The transformation into the modal space is completed after multiplication of the above equation with $\vec{V}^T$ on both sides, the result reading $\vec{V}^T \cdot \vec{M} \cdot \vec{V} \cdot \ddot{\vec{m}} + \vec{V}^T \cdot \vec{K} \cdot \vec{V} \cdot \vec{m} = \vec{V}^T \cdot \vec{F}$. Thereby the transformed (diagonal) mass and rigidity matrices as well as the modal forces $\vec{F}_m = \vec{V}^T \cdot \vec{F}$ can consequently be incorporated into the control for vibration isolation.

The sensor matrix will again be designated below by $\bar{g}_s$ and the actuator matrix by $\bar{g}_a$. Similarly to the previously described transformation, these matrices are again used for transformation of the vectors $\vec{c}$ and the forces $\vec{F}$ based on Cartesian coordinates into sensor measurement values $\vec{s}$ or actuator forces $\vec{F}_a$ according to:

$\vec{s} = \vec{g}_s^T \cdot \vec{c}$ and $\vec{F}_a = \vec{g}_a^T \cdot \vec{F}$. Consequently it is further guaranteed according to the invention that modal coordinates can also be transformed into sensor coordinates and actuator coordinates in particular by: $\vec{s} = \vec{g}_s^T \cdot \vec{V} \cdot \vec{m}$ and $\vec{F}_a = \vec{g}_a^T \cdot \vec{V}^{-T} \cdot \vec{F}_m$, respectively, where the superscript "−T" stands for a transposed inverse matrix.

Therefore the initially described calculated sensor and actuator control matrices $g_s$ and $g_a$, respectively, will be processed into the sensor and actuator control matrices $\vec{g}_{s\_eff}$ and $\vec{g}_{a\_eff}$ effective for the further modal coupling, in particular via the functional processing rule $\vec{g}_{s\_eff} = \vec{V}^T \cdot \vec{g}_s$ and $\vec{g}_{a\_eff} = \vec{V}^{-1} \cdot \vec{g}_a$.

A control system and a control device according to the invention thus processes, for a given active vibration isolation system with substantially arbitrary geometry, six individual control loops decoupled from one another for six degrees of freedom. Each degree of freedom or each motion running along an axis of a mass to be isolated in regard to vibrations can thus be controlled independently of the others, without additional calculations needing to be taken into consideration for compensating cross-couplings in the individual control paths.

The calculation algorithms, matrix operations and vector operations necessary for the invention are expediently implemented by software of the control device, and consequently also enable a self adjustment of the entire control systems before the actual control.

In regard to the preferred geometry of isolator modules for the control system according to the invention, the contents of the European Patent application with filing number 06 026 425 by the same applicant submitted on Dec. 20, 2006 are hereby incorporated into the present application in full by reference.

Such a preferred isolator module or suspension system for vibration isolation and/or damping, which is therefore in particular a vertically and/or horizontally acting air bearing, consequently comprises a base plate, an intermediate part that is arranged movably on the base plate and, particularly in the operating state, can move horizontally and/or vertically relative to the latter, and a piston which is arranged movably inside the intermediate part and bears a load to be isolated and/or damped from vibrations in the horizontal and/or vertical direction with respect to the base plate. In order to achieve as high a carrying capacity of the suspension system as possible with as small an overall size of the suspension system as possible, which is also determined by the diameter of the piston, and in order to be able to select as small a wall thickness as possible, the ratio of the diameter of the upper side of the piston in the suspension system to the wall thickness of the intermediate part is between 10 to 36, preferably 10 to 16 or in a particularly preferred embodiment between 10.7 to 15.1. Such a suspension system, described specifically and in detail in the above-referenced patent application, has eigenmodes on the order of 0.1 Hz-10 Hz, 0.2-5 Hz and 0.5-1.5 Hz, respectively, as a function of the mass distribution.

A preferred embodiment of a control system within the scope of the invention consequently further comprises a compressed air source to provide the entire system with a volume flow, and at least one electropneumatic servo valve that can modulate the pressure inside the isolator with the objective of controlling the isolator excursion to a desired value, and at least one volume flow controller between the servo control valve and the isolator air volume. The vibration isolation system further contains an electrodynamic or electromagnetic linear actuator for generating relative forces between the ground and the supported or isolated mass, so that the signals obtained with the control system according to the invention can be used, after the above-described further processing of the sensor signals, as outputs to the servo valves for modulating the internal pressure of the bearing and/or as outputs to the linear actuators.

Figure 5:
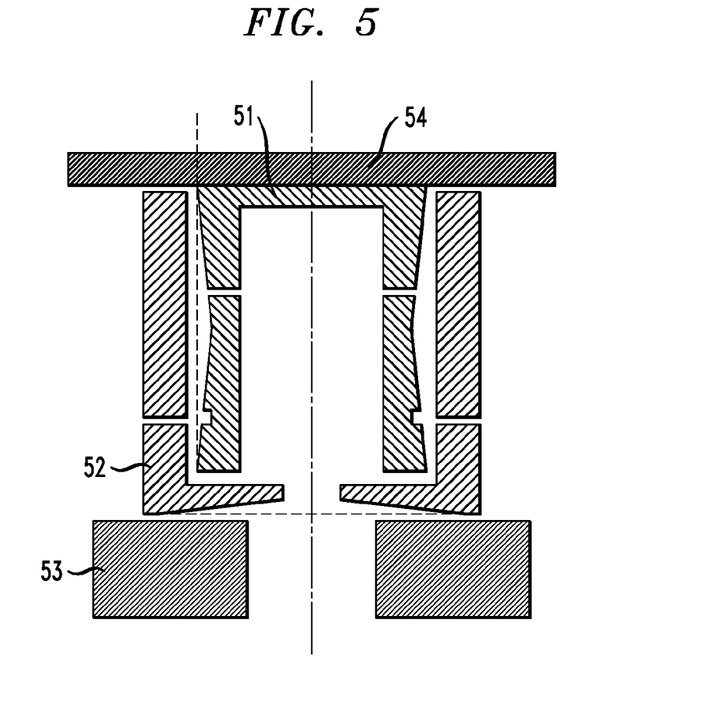
FIG. 5: a simplified schematic representation in section of an isolator module for use with the control device according to the invention.

FIG. 5 shows a considerably simplified schematic representation of such a preferred isolator module within the scope of the invention. The suspension system according to the invention comprises a base plate 53, an intermediate part 52 and a piston 51. Intermediate part 52 is arranged on base plate 53 and is movable relative to base plate 53 particularly in the operating state, i.e. with the airflow turned on, and can move horizontally and vertically with respect to it. Piston 51 is movably arranged inside intermediate part 52 and, particularly in the operating state, bears a load 54 arranged on it. Base plate 53 is preferably in turn connected to a holding device in or on a frame system. In order to avoid repetition, the reader is referred in regard to the additional details to the above fully incorporated European Patent application with filing number 06 026 425.

What is claimed is:

1. A control system for active vibration isolation of a supported payload, the control system comprising:

a plurality of vibration signal transducers or sensors for supplying sensor signals;

a plurality of actuators for vibration suppression;

a control device for processing the sensor signals into actuator control signals, wherein the control device performs processing of position data and orientation data of all available sensors into a sensor control matrix ($\vec{g}_s$) and processing of position data and orientation data of all available actuators from the plurality of actuators into an actuator control matrix ($\vec{g}_s$), for subsequent calculation of axis input signals in orthogonal degrees of freedom from the sensor signals and the sensor control matrix, and of axis output signals in orthogonal degrees of freedom for vibration suppression from the axis input signals, and for calculation of correspondingly weighted actuator control signals from the axis output signals and the actuator control matrix; and processing units that generate a matrix of the form $$\vec{A} = \begin{bmatrix} (\vec{r}_{g1})_x & (\vec{r}_{g2})_x & \cdots & (\vec{r}_{gN_x})_x \\ (\vec{r}_{g1})_y & (\vec{r}_{g2})_y & \cdots & (\vec{r}_{gN_y})_y \\ (\vec{r}_{g1})_z & (\vec{r}_{g2})_z & \cdots & (\vec{r}_{gN_z})_z \\ (\vec{p}_{g1} \times \vec{r}_{g1})_x & (\vec{p}_{g2} \times \vec{r}_{g2})_x & \cdots & (\vec{p}_{gN_g} \times \vec{r}_{gN_g})_x \\ (\vec{p}_{g1} \times \vec{r}_{g1})_y & (\vec{p}_{g2} \times \vec{r}_{g2})_y & \cdots & (\vec{p}_{gN_g} \times \vec{r}_{gN_g})_y \\ (\vec{p}_{g1} \times \vec{r}_{g1})_z & (\vec{p}_{g2} \times \vec{r}_{g2})_z & \cdots & (\vec{p}_{gN_g} \times \vec{r}_{gN_g})_z \end{bmatrix}$$

from position data and orientation data of the sensors and actuators to be input, where $N_g$ represents the number of sensors or actuators, $\vec{p}_{gi}$: the respective positions and $\vec{r}_{gi}$ the respective directions in relation to a fixed reference point of a dynamic system consisting of the supported payload and isolator modules, and based thereon, generate the sensor control matrix in the form $\vec{g} = [g\ \vec{g}]$ for decoupling the axis input signals, or the actuator control matrix for distributing the calculated decoupled output axis signals onto actuator control signals, and with $g_{ij}$ being the orientation of the i-th sensor or actuator, correspondingly process the respective sensor signal or actuator control signals weighted proportionally relative to the j-th Cartesian degree of freedom.

2. The control system according to claim 1, wherein the supported payload is supported by at least one isolator module which comprises
- a base plate,
- an intermediate part movably arranged on the base plate and
- a piston that is movably arranged inside the intermediate part and bears a load to be isolated from vibrations in the horizontal and vertical directions, wherein the diameter of the upper side of the piston is in a ratio to the wall thickness of the intermediate part of 10 to 36.

3. The control system according to claim 1, in which the processing units calculate definite solution vectors of the sensor control matrix or the actuator control matrix by means of a singular value decomposition.

4. The control system according to claim 1, in which the control device performs a calculation of the rigid-body eigenmodes of the dynamic system consisting of the supported payload and the isolator modules, based on input data that describes the mass and the main moments of inertia of the rigid body, the number of passive isolator modules, their respective rigidity, as well as their position and direction in relation to the center of gravity.

5. The control system according to claim 4, in which the control device comprises calculation units for calculating the eigenvectors of the dynamic system in modal coordinates.

6. The control system according to claim 1, which, based on sensor control matrices and actuator control matrices calculated for Cartesian coordinates ($\bar{g}_s$ and $\bar{g}_a$ respectively), processes them into sensor control matrices and actuator control matrices effective for modal decoupling ($\bar{g}_{s\_eff}$ and $\bar{g}_{a\_eff}$ respectively), in particular, via the functional processing rule $\bar{g}_{s\_eff} = \bar{V}^T \cdot \bar{g}_s$ and $\bar{g}_{a\_eff} = \bar{V}^{-1} \cdot \bar{g}_a$ respectively, where $\bar{V}$ contains the eigenvectors, calculated by the control device, of the dynamic system consisting of the supported payload and the isolator modules.

7. A control device for a control system for active vibration isolation of a supported payload, the control device comprising:
- a first processing unit for processing position data and orientation data of all available sensors to supply a sensor control matrix ($\bar{g}_s$) as well as for subsequent calculation of axis input signals in orthogonal degrees of freedom from the sensor signals and the sensor control matrix;
- a control-path cascade block for processing the axis input signals into axis output signals in orthogonal degrees of freedom; and
- a second processing unit for processing position and orientation data of all available actuators for vibration suppression into an actuator control matrix ($\bar{g}_a$), as well as for subsequent calculation of actuator control signals from the axis output signals and the actuator control matrix;

wherein the first and second processing units generate a matrix of the form $$\vec{A} = \begin{bmatrix} (\vec{r}_{g1})_x & (\vec{r}_{g2})_x & \cdots & (\vec{r}_{gN_x})_x \\ (\vec{r}_{g1})_y & (\vec{r}_{g2})_y & \cdots & (\vec{r}_{gN_y})_y \\ (\vec{r}_{g1})_z & (\vec{r}_{g2})_z & \cdots & (\vec{r}_{gN_z})_z \\ (\vec{p}_{g1} \times \vec{r}_{g1})_x & (\vec{p}_{g2} \times \vec{r}_{g2})_x & \cdots & (\vec{p}_{gN_g} \times \vec{r}_{gN_g})_x \\ (\vec{p}_{g1} \times \vec{r}_{g1})_y & (\vec{p}_{g2} \times \vec{r}_{g2})_y & \cdots & (\vec{p}_{gN_g} \times \vec{r}_{gN_g})_y \\ (\vec{p}_{g1} \times \vec{r}_{g1})_z & (\vec{p}_{g2} \times \vec{r}_{g2})_z & \cdots & (\vec{p}_{gN_g} \times \vec{r}_{gN_g})_z \end{bmatrix}$$

from position data and orientation data of the sensors and actuators to be input, where $N_g$ represents the number of sensors or actuators, $\vec{p}_{gi}$ the respective positions and $\vec{r}_{gi}$ the respective directions in relation to a fixed reference point of a dynamic system consisting of the supported payload and isolator modules, and based thereon, generate the sensor control matrix for decoupling the axis input signals, or the actuator control matrix for distributing the calculated decoupled axis output signals onto actuator control signals in the form $\bar{g} = [g_{ij}]$ and, with $q_{ij}$ being the orientation of the i-th sensor or actuator, correspondingly process the respective sensor signal or actuator control signals weighted proportionally relative to the j-th Cartesian degree of freedom.

8. The control device according to claim 7, in which the first and second processing units perform a singular value decomposition for calculating definite solution vectors of the sensor control matrix or the actuator control matrix.

9. The control device according to claim 7, in which the first and second processing units perform a calculation of the rigid-body eigenmodes of a dynamic system consisting of the supported payload and the isolator modules, based on input data that describes the main moments of inertia $I_{xx}$, $I_{yy}$ and $I_{zz}$ of the rigid body, the number $N_{IM}$ of passive isolator modules, their respective rigidity as well as their position and direction in relation to the center of gravity.

10. The control device according to claim 9, in which the first and second processing units are for calculating the eigenvectors of the dynamic system in modal coordinates, and including the calculated vectors, further process sensor control matrices and actuator control matrices calculated based on Cartesian coordinates into sensor control matrices and actuator control matrices effective for modal decoupling.

* * * * *